(12) United States Patent
Fung

(10) Patent No.: US 10,155,133 B2
(45) Date of Patent: Dec. 18, 2018

(54) SYSTEM AND METHOD FOR A MIXED OR VIRTUAL REALITY-ENHANCED STATIONARY EXERCISE BICYCLE

(71) Applicant: Blue Goji LLC, Austin, TX (US)

(72) Inventor: Coleman Fung, Spicewood, TX (US)

(73) Assignee: Blue Goji LLC, Austin, TX (US)

( * ) Notice: Subject to any disclaimer, the term of this patent is extended or adjusted under 35 U.S.C. 154(b) by 0 days.

(21) Appl. No.: 16/011,394

(22) Filed: Jun. 18, 2018

(65) Prior Publication Data

US 2018/0290017 A1 Oct. 11, 2018

Related U.S. Application Data

(63) Continuation-in-part of application No. 15/853,746, filed on Dec. 23, 2017, which is a continuation of
(Continued)

(51) Int. Cl.
| | |
|---|---|
| A63B 24/00 | (2006.01) |
| A63F 13/214 | (2014.01) |
| A63F 13/212 | (2014.01) |
| A63F 13/65 | (2014.01) |
| G06F 1/16 | (2006.01) |
| G06T 19/00 | (2011.01) |
| A63B 23/04 | (2006.01) |
| A63B 22/00 | (2006.01) |
| A63B 22/02 | (2006.01) |
| A63B 22/06 | (2006.01) |
| A63F 13/40 | (2014.01) |
| G06F 3/01 | (2006.01) |
| H04W 84/18 | (2009.01) |

(52) U.S. Cl.
CPC ...... *A63B 24/0003* (2013.01); *A63B 22/0046* (2013.01); *A63B 22/0285* (2013.01); *A63B 22/0292* (2015.10); *A63B 22/06* (2013.01); *A63B 23/04* (2013.01); *A63F 13/212* (2014.09); *A63F 13/214* (2014.09); *A63F 13/40* (2014.09); *A63F 13/65* (2014.09); *G06F 1/163* (2013.01); *G06F 3/011* (2013.01); *G06F 3/016* (2013.01); *G06T 19/006* (2013.01); *H04W 84/18* (2013.01)

(58) Field of Classification Search
CPC ..... A63B 24/0003; A63B 24/23; A63B 24/04; A63B 22/0046; A63B 22/0292; A63B 22/0285; A63B 22/06; A63F 13/214; A63F 13/212; A63F 13/65; A63F 13/40; G06F 3/016; G06F 3/011
See application file for complete search history.

(56) References Cited

U.S. PATENT DOCUMENTS 5,070,816 A * 12/1991 Wehrell ............... A01K 15/027
119/702
7,113,166 B1 * 9/2006 Rosenberg ......... A63B 21/0057
345/156

(Continued)

*Primary Examiner* — Glenn Richman
(74) *Attorney, Agent, or Firm* — Galvin Patent Law LLC; Brian R. Galvin

(57) ABSTRACT

A system and method for a mixed or virtual reality-enhanced stationary exercise bicycle, comprising a stationary bicycle device, a belt-like attachment, and a mechanical arm attachment attached to the base of a stationary bike, used for measuring and determining user position for virtual or mixed reality-enhanced software.

12 Claims, 13 Drawing Sheets

Related U.S. Application Data application No. 15/219,115, filed on Jul. 25, 2016, now Pat. No. 9,849,333, which is a continuation-in-part of application No. 15/193,112, filed on Jun. 27, 2016, which is a continuation-in-part of application No. 15/187,787, filed on Jun. 21, 2016, which is a continuation-in-part of application No. 15/175,043, filed on Jun. 7, 2016, now Pat. No. 9,766,696, application No. 16/011,394, which is a continuation-in-part of application No. 15/853,746, which is a continuation of application No. 15/219,115, which is a continuation-in-part of application No. 15/193,112, which is a continuation-in-part of application No. 15/187,787, which is a continuation-in-part of application No. 14/846,966, filed on Sep. 7, 2015, and a continuation-in-part of application No. 14/012,879, filed on Aug. 28, 2013.

(60) Provisional application No. 62/330,642, filed on May 2, 2016, provisional application No. 62/330,602, filed on May 2, 2016, provisional application No. 62/310,568, filed on Mar. 18, 2016, provisional application No. 61/696,068, filed on Aug. 31, 2012.

(56) References Cited

U.S. PATENT DOCUMENTS

| | | | |
|---|---|---|---|
| 8,012,107 B2 * | 9/2011 | Einav | G06F 19/00 601/5 |
| 9,402,578 B2 * | 8/2016 | Tetsuka | A61B 5/7455 |
| 2006/0063645 A1 | 3/2006 | Chiang | |
| 2007/0042868 A1 | 2/2007 | Fisher et al. | |
| 2007/0123390 A1 | 5/2007 | Mathis | |

* cited by examiner

SYSTEM AND METHOD FOR A MIXED OR VIRTUAL REALITY-ENHANCED STATIONARY EXERCISE BICYCLE

CROSS-REFERENCE TO RELATED APPLICATIONS

This present application is a continuation-in-part of Ser. No. 15/853,746, titled "VARIABLE-RESISTANCE EXERCISE MACHINE WITH WIRELESS COMMUNICATION FOR SMART DEVICE CONTROL AND INTERACTIVE SOFTWARE APPLICATIONS", and filed on Dec. 23, 2017, which is a continuation of U.S. patent application Ser. No. 15/219,115, titled "VARIABLE-RESISTANCE EXERCISE MACHINE WITH WIRELESS COMMUNICATION FOR SMART DEVICE CONTROL AND VIRTUAL REALITY APPLICATIONS", and filed on Jul. 25, 2016, now issued as U.S. Pat. No. 9,849,333 on Dec. 26, 2017, which claims the benefit of, and priority to, U.S. provisional patent application Ser. No. 62/330,642, titled "VARIABLE-RESISTANCE EXERCISE MACHINE WITH WIRELESS COMMUNICATION FOR SMART DEVICE CONTROL AND VIRTUAL REALITY APPLICATIONS" and filed on May 2, 2016, and is also a continuation-in-part of Ser. No. 15/193,112, titled "NATURAL BODY INTERACTION FOR MIXED OR VIRTUAL REALITY APPLICATIONS", and filed on Jun. 27, 2016, which claims the benefit of, and priority to, U.S. provisional patent application Ser. No. 62/330,602, titled "NATURAL BODY INTERACTION FOR MIXED OR VIRTUAL REALITY APPLICATIONS" and filed on May 2, 2016, and is also a continuation-in-part of U.S. patent application Ser. No. 15/187,787, titled "MULTIPLE ELECTRONIC CONTROL AND TRACKING DEVICES FOR MIXED-REALITY INTERACTION", and filed on Jun. 21, 2016, which is a continuation-in-part of U.S. patent application Ser. No. 15/175,043, titled "APPARATUS FOR NATURAL TORSO TRACKING AND FEEDBACK FOR ELEC IRONIC INTERACTION" and filed on Jun. 7, 2016, now issued as U.S. Pat. No. 9,766,696 on Sep. 19, 2017, which claims the benefit of, and priority to, U.S. provisional patent application Ser. No. 62/310,568, titled "APPARATUS FOR NATURAL TORSO TRACKING AND FEEDBACK FOR ELECTRONIC INTERACTION" and filed on Mar. 18, 2016, the entire specification of each of which is incorporated herein by reference in its entirety.

This present application is a continuation-in-part of Ser. No. 15/853,746, titled "VARIABLE-RESISTANCE EXERCISE MACHINE WITH WIRELESS COMMUNICATION FOR SMART DEVICE CONTROL AND INTERACTIVE SOFTWARE APPLICATIONS", and filed on Dec. 23, 2017, which is a continuation of U.S. patent application Ser. No. 15/219,115, titled "VARIABLE-RESISTANCE EXERCISE MACHINE WITH WIRELESS COMMUNICATION FOR SMART DEVICE CONTROL AND VIRTUAL REALITY APPLICATIONS", and filed on Jul. 25, 2016, now issued as U.S. Pat. No. 9,849,333 on Dec. 26, 2017, which is a continuation-in-part of Ser. No. 15/193,112, titled "NATURAL BODY INTERACTION FOR MIXED OR VIRTUAL REALITY APPLICATIONS", which is a continuation-in-part of Ser. No. 15/187,787, titled "MULTIPLE ELECTRONIC CONTROL AND TRACKING DEVICES FOR MIXED-REALITY INTERACTION", and filed on Jun. 21, 2016, which is a continuation-in-part of U.S. patent application Ser. No. 14/846,966, titled "MULTIPLE ELECTRONIC CONTROL DEVICES" and filed on Sep. 7, 2015, and is also a continuation-in-part of U.S. patent application Ser. No. 14/012,879, titled "Mobile and Adaptable Fitness System" and filed on Aug. 28, 2013, which claims the benefit of, and priority to, U.S. provisional patent application Ser. No. 61/696,068, titled "Mobile and Adaptable Fitness System" and filed on Aug. 31, 2012, the entire specification of each of which is incorporated herein by reference in its entirety.

BACKGROUND OF THE INVENTION

Field of the Art

The disclosure relates to the field of mixed or virtual reality, specifically to the field of combined physical peripherals for the uses of extending mixed or virtual reality immersion.

Discussion of the State of the Art

Currently, it is possible to use a peripheral device similar to a modified stationary bike in concept, in conjunction with mixed or virtual reality headgear, to achieve an increased level of immersion in mixed or virtual reality software for the purposes of gaming, training, and more. Such systems may even attach a haptic feedback vest with vibration motors inside to attempt to give a person a sense of "feeling" in a mixed or virtual reality program, and hand controls with motion detection (acceleration and orientation) to allow a user to feel like they are truly interacting with the mixed or virtual world. However, what is not possible is a user's ability to use any kind of bicycle system in conjunction with mixed or virtual reality controls and software, in an effort to simulate a wider range of motions and tasks beyond the conventional sitting, standing or reclining in a bicycle position, regardless of whether the bicycle pedals are used in the actual simulation.

What is needed is a system and method for a mixed or virtual reality-enhanced stationary exercise bicycle.

SUMMARY OF THE INVENTION

Accordingly, the inventor has conceived and reduced to practice, in a preferred embodiment of the invention, a system and methods for supporting an extended range of user motions and movements beyond the conventional sitting, standing, or reclining in a bicycle position. The extended range of user motions and movements include but are not limited to: totally free hand and arm movements while holding and controlling mixed or virtual reality input devices (without holding onto the bicycle handlebar), body leaning or twisting while sitting or standing, and other combinations of motions and movements carried out without holding onto the bicycle handlebar. The following non-limiting summary of the invention is provided for clarity, and should be construed consistently with embodiments described in the detailed description below.

To solve the problem of limited engagement in a mixed or virtual reality environment using a bicycle system, a system has been devised for a mixed or virtual reality-enhanced stationary exercise bicycle, comprising a processor, a memory, a harness, a mechanical arm, a plurality of joints, a plurality of angular sensors, a plurality of button inputs, a pressure sensor, a network adapter, and a first plurality of programming instructions stored in the memory and operating on the processor, wherein the mechanical arm is outfitted with a plurality of joints and angular sensors, and wherein the first programming instructions, when operating on the processor, cause the processor to: measure the angle of movement in the mechanical arm; detect and characterize pressure on the seat of the stationary exercise bicycle; receive input through buttons; detect and characterize the movement of the harness; operate a commercial operating system; and execute virtual reality software.

A method for a mixed or virtual reality-enhanced stationary exercise bicycle has been devised, comprising the steps of: receiving input, using buttons, a harness, and a stationary exercise bicycle; detecting and characterizing user position, using a pressure sensor and a stationary exercise bicycle; detecting and characterizing user position, using a mechanical arm, a harness, and a stationary exercise bicycle; processing input received, using a processor; sending data to a computing device, using a stationary exercise bicycle, and a network adapter; and execute virtual reality software, using a processor and stationary exercise bicycle.

According to preferred embodiment of the invention, a system for a mixed or virtual reality-enhanced stationary exercise bicycle, comprising: a stationary exercise bicycle; a mechanical arm comprising a plurality of hinges and a plurality of tethers affixed to the body of a user while seated at the stationary exercise bicycle, at least one of the plurality of hinges comprising an angular sensor that measures the openness of the hinge; and a composition server comprising at least a plurality of programming instructions stored in a memory and operating on a processor of a network-connected computing device. The programming instructions are configured to: receive input data based on motion of a user's body from a plurality of hardware devices via a network, the plurality of hardware devices comprising at least the angular sensor and the plurality of tethers; produce a plurality of control commands based on the received input data; produce a composite data stream based at least in part on at least a portion of the received input data and the control commands, wherein the composite data stream further comprises derived data produced from analysis of at least a portion of the received input data, wherein the derived data comprises data pertaining to the position of a plurality of body parts relative to one another. The plurality of tethers provides a haptic feedback signal to a mixed or virtual reality application, and one or more of the plurality of tethers physically limits a user's motion based at least in part on the haptic feedback signal.

According to further aspects, the plurality of hardware devices further comprise a pressure sensor. In some aspects, the pressure sensor is a component of a seat of the stationary exercise bicycle. In some aspects, the stationary exercise bicycle further comprises a plurality of hardware controls, the hardware controls comprising at least a button, and wherein the plurality of hardware devices comprises at least a portion of the hardware controls. Also, the hardware controls may in some aspects comprise at least one pedal of the stationary exercise bicycle.

According to another preferred embodiment, a method for a mixed or virtual reality-enhanced stationary exercise bicycle is disclosed, comprising the steps of: receiving, at a composition server comprising at least a plurality of programming instructions stored in a memory and operating on a processor of a network-connected computing device and configured to receive input data based on motion of a user's body from a plurality of hardware devices via a network, and configured to produce a plurality of operations of the virtual body joystick based at least in part on at least a portion of the received input data, and configured to produce a composite data stream based at least in part on at least a portion of the received input data and the virtual body joystick operations, a plurality of device inputs received from a plurality of hardware devices; producing a plurality of control commands based at least in part on the plurality of device inputs; producing a composite data stream based at least in part on at least a portion of the received input data and the control commands, wherein the composite data stream further comprises derived data produced from analysis of at least a portion of the received input data, wherein the derived data comprises data pertaining to the position of a plurality of body parts relative to one another; wherein at least a portion of the plurality of hardware devices comprise a mechanical arm comprising a plurality of hinges and a plurality of tethers affixed to the body of a user while seated at the stationary exercise bicycle, at least one of the plurality of hinges comprising an angular sensor that measures the openness of the hinge; wherein the plurality of tethers provides a haptic feedback signal to a mixed or virtual reality application; and wherein one or more of the plurality of tethers physically limits a user's motion based at least in part on the haptic feedback signal.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
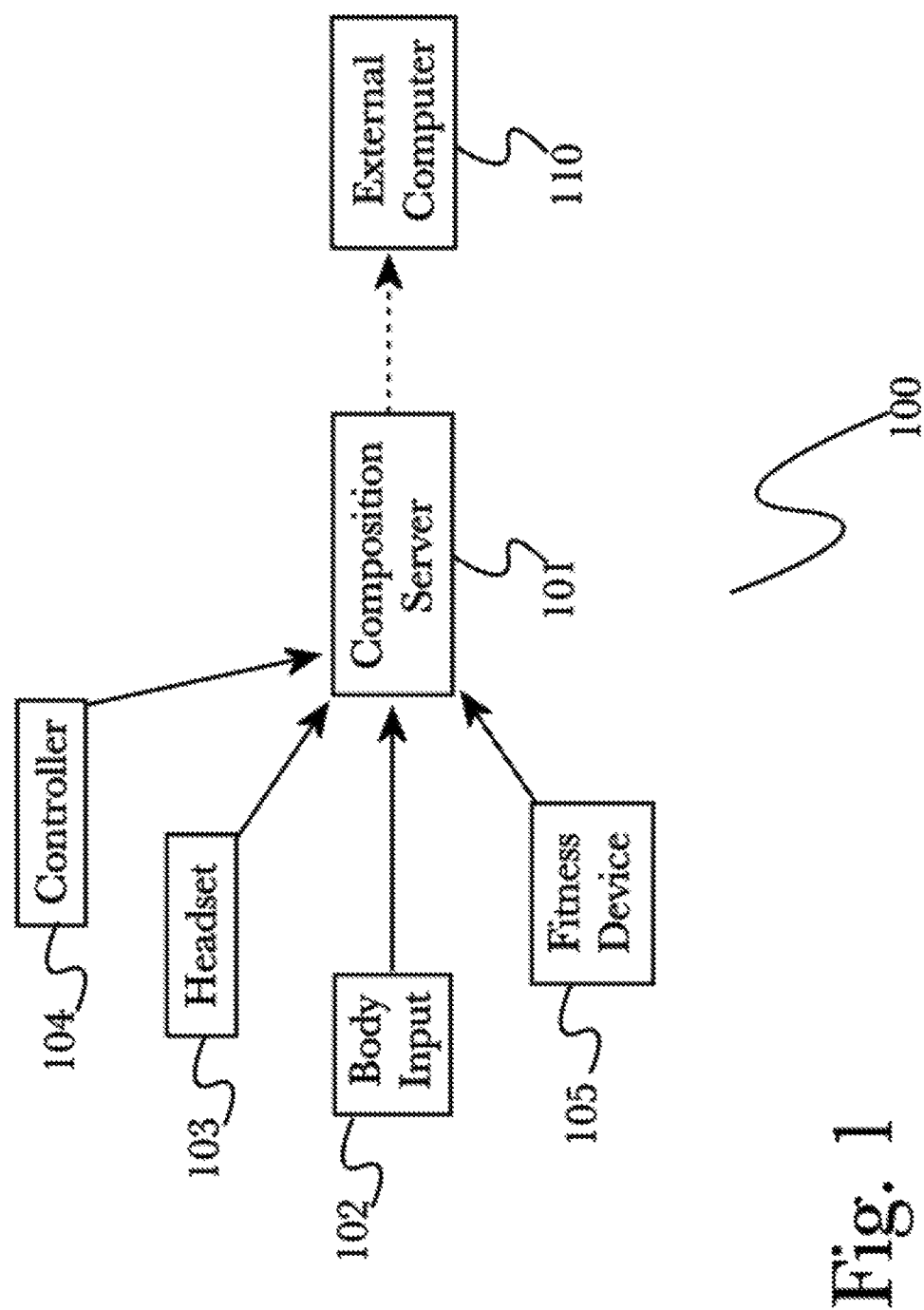
FIG. 1 is a block diagram of an exemplary system architecture for natural body interaction for mixed or virtual reality applications, according to a preferred aspect of the invention.

The inventor has conceived, and reduced to practice, a system and method for . . . .

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram of an exemplary system architecture 100 for natural body interaction for mixed or virtual reality applications, according to a preferred embodiment of the invention. According to the embodiment, a composition server 101 comprising programming instructions stored in a memory 11 and operating on a processor 12 of a computing device 10 (as described below, with reference to FIG. 5), may be configured to receive a plurality of input data from various connected devices. Such input devices may include (but are not limited to) a variety of hardware controller devices 104 (such as a gaming controller [such as GOJI PLAY™ controllers], motion tracking controller, or traditional computer input devices such as a keyboard or mouse), a headset device 103 such as an augmented reality or mixed or virtual reality headset (for example, OCULUS RIFT™, HTC VIVE™, SAMSUNG GEAR VR™, MICROSOFT MIXED REALITY™, or other headset devices), a variety of fitness devices 105 (for example, fitness tracking wearable devices such as FIT-BIT™, MICROSOFT BAND™, APPLE WATCH™, or other wearable devices), or a variety of body input 102 tracking devices or arrangements, such as using a plurality of tethers attached to the environment and a harness worn by a user, configured to track movement and position of the user's body.

Various input devices may be connected to composition server 101 interchangeably as desired for a particular arrangement or use case, for example a user may wish to use a controller 104 in each hand and a headset 103, but omit the use of fitness devices 105 altogether. During operation, composition server 101 may identify connected devices and load any stored configuration corresponding to a particular device or device type, for example using preconfigured parameters for use as a default configuration for a new controller, or using historical configuration for a headset based on previous configuration or use. For example, a user may be prompted (or may volunteer) to provide configuration data for a particular device, such as by selecting from a list of options (for example, "choose which type of device this is", or "where are you wearing/holding this device", or other multiple-choice type selection), or composition server 101 may employ machine learning to automatically determine or update device configuration as needed. For example, during use, input values may be received that are determined to be "out of bounds", for example an erroneous sensor reading that might indicate that a user has dramatically shifted position in a way that should be impossible (for example, an erroneous reading that appears to indicate the user has moved across the room and back again within a fraction of a second, or has fallen through the floor, or other data anomalies). These data values may be discarded, and configuration updated to reduce the frequency of such errors in the future, increasing the reliability of input data through use.

Composition server 101 may receive a wide variety of input data from various connected devices, and by comparing against configuration data may discard undesirable or erroneous readings as well as analyze received input data to determine more complex or fine-grained measurements. For example, combining input from motion-sensing controllers 104 with a motion-sensing headset 103 may reveal information about how a user is moving their arms relative to their head or face, such as covering their face to shield against a bright light or an attack (within a game, for example), which might otherwise be impossible to determine with any reliability using only the controllers themselves (as it may be observed that a user is raising their hands easily enough, but there is no reference for the position or movement of their head). These derived input values may then be combined into a single composite input data stream for use by various software applications, such as augmented reality or mixed or virtual reality productivity applications (for example, applications that assist a user in performing manual tasks by presenting virtual information overlays onto their field of vision, or by playing audio directions to instruct them while observing their behavior through input devices, or other such applications), or mixed or virtual reality applications or games, such as simulation games that translate a user's movement or position into in-game interaction, for example by moving a user's in-game character or avatar based on their physical movements as received from input devices. In some arrangements, composition server 101 may operate such software applications in a standalone manner, functioning as a computer or gaming console as needed. In other arrangements, composition server 101 may provide the composite data for use by an external computer 110, such as a connected gaming console, mixed or virtual reality device, personal computer, or a server operating via a network in the cloud (such as for online gaming arrangements, for example). In this manner, the composite data functions of the embodiment may be utilized with existing hardware if desired, or may be provided in a standalone package such as for demonstrations or public use, or for convenient setup using a single device to provide the full interaction experience (in a manner similar to a household gaming console, wherein all the functions of computer components may be prepackaged and setup to minimize difficulty for a new user).

Figure 2:
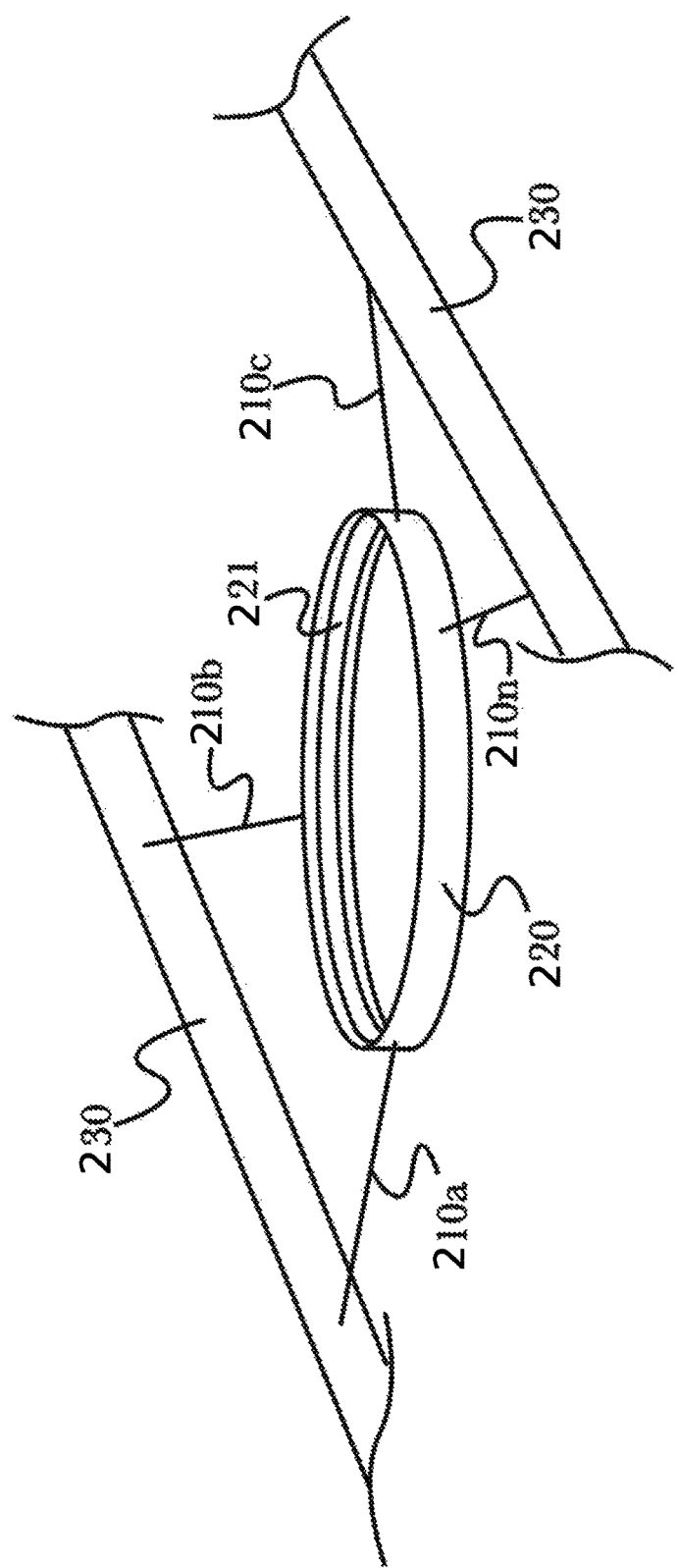
FIG. 2 is a diagram of an exemplary hardware arrangement of an apparatus for natural body tracking and feedback for electronic interaction according to a preferred aspect of the invention, illustrating the use of multiple tethers and a movable body harness.

FIG. 2 is a diagram of an exemplary hardware arrangement 200 for natural body tracking and feedback for electronic interaction according to a preferred embodiment of the invention, illustrating the use of multiple tethers 210*a-n* and a movable body harness 220. According to the embodiment, a plurality of tethers 210*a-n* may be affixed or integrally-formed as part of the stationary bike frame 230. In alternate arrangements, specifically-designed equipment with integral tethers 210*a-n* may be used, but it may be appreciated that a modular design with tethers 210*a-n* that may be affixed and removed freely may be desirable for facilitating use with a variety of fitness equipment or structural elements of a building, according to a user's particular use case or circumstance. Tethers 210*a-n* may then be affixed or integrally-formed to a body harness 220, as illustrated in the form of a belt, that may be worn by a user such that movement of their body affects tethers 210*a-n* and applies stress to them in a variety of manners. It should be appreciated that while a belt design for a body harness 220 is shown for clarity, a variety of physical arrangements may be used such as including (but not limited to) a vest, a series of harness-like straps similar to climbing or rappelling equipment, a backpack, straps designed to be worn on a user's body underneath or in place of clothing (for example, for use in medical settings for collecting precise data) or a plurality of specially-formed clips or attachment points that may be readily affixed to a user's clothing. Additionally, a body harness 220 may be constructed with movable parts, for example having an inner belt 221 that permits a user some degree of motion within the harness 220 without restricting their movement. Movement of inner belt 221 (or other movable portions) may be measured in a variety of ways, such as using accelerometers, gyroscopes, or optical sensors, and this data may be used as interaction with software applications in addition to data collected from tethers 210*a-n* as described below.

As a user moves, their body naturally shifts position and orientation. These shifts may be detected and measured via tethers or structurally embedded sensors 210*a-n*, for example by detecting patterns of tension or strain on tethers or sensors 210*a-n* to indicate body orientation, or by measuring small changes in strain on tethers or sensors 210*a-n* to determine more precise movements such as body posture while a user is speaking, or specific characteristics of a user's riding posture or position. Additionally, through varying the quantity and arrangement of tethers or sensors 210*a-n*, more precise or specialized forms of movement may be detected and measured (such as, for example, using a specific arrangement of multiple tethers or sensors connected to a particular area of a user's body to detect extremely small movements for medical diagnosis or fitness coaching). This data may be used as interaction with software applications, such as for mixed or virtual reality applications as input for a user to control a character in a game. In such an arrangement, when a user moves, this movement may be translated to an in-game character or avatar to convey a more natural sense of interaction and presence. For example, in a multiplayer roleplaying game, this may be used to facilitate nonverbal communication and recognition between players, as their distinct mannerisms and gestures may be conveyed in the game through detection of natural body position and movement. In fitness or health applications, this data may be used to track and monitor a user's posture or ergonomic qualities, or to assist in coaching them for specific fitness activities such as holding a pose for yoga, stretching, or proper spinning form. In medical applications, this data may be used to assist in diagnosing injuries or deficiencies that may require attention, such as by detecting anomalies in movement or physiological adaptations to an unrecognized injury (such as when a user subconsciously shifts their weight off an injured foot or knee, without consciously realizing an issue is present).

Through various arrangements of tethers 210a-n or structurally embedded sensors (as described below, referring to FIGS. 3-4), it may be possible to enable a variety of immersive ways for a user to interact with software applications, as well as to receive haptic feedback from applications. For example, by detecting rotation, tension, stress, or angle of tethers or embedded sensors a user may interact with applications such as mixed or virtual reality games or simulations, by using natural body movements (such as leaning, rotating, and weight-shifting) and a range of riding positions between seated and standing to trigger actions within a software application configured to accept body tracking input. By applying haptic feedback of varying form and intensity (as is described in greater detail below, referring to FIG. 3), applications may provide physical indication to a user of software events, such as applying tension to resist movement, pulling or tugging on a tether to move or "jerk" a user in a direction, or varying feedback to multiple tethers such as tugging and releasing in varying order or sequence to simulate more complex effects such as (for example, in a gaming use case) explosions, riding in a vehicle, or riding a bike through foliage.

It should be appreciated that while reference is made to mixed or virtual reality applications, a wide variety of use cases may be possible according to the embodiment. For example, body tracking may be used for fitness, training, conditioning, health and rehab applications, to monitor a user's posture, position and strength while riding, without the use of additional mixed or virtual reality equipment or software.

Figure 3:
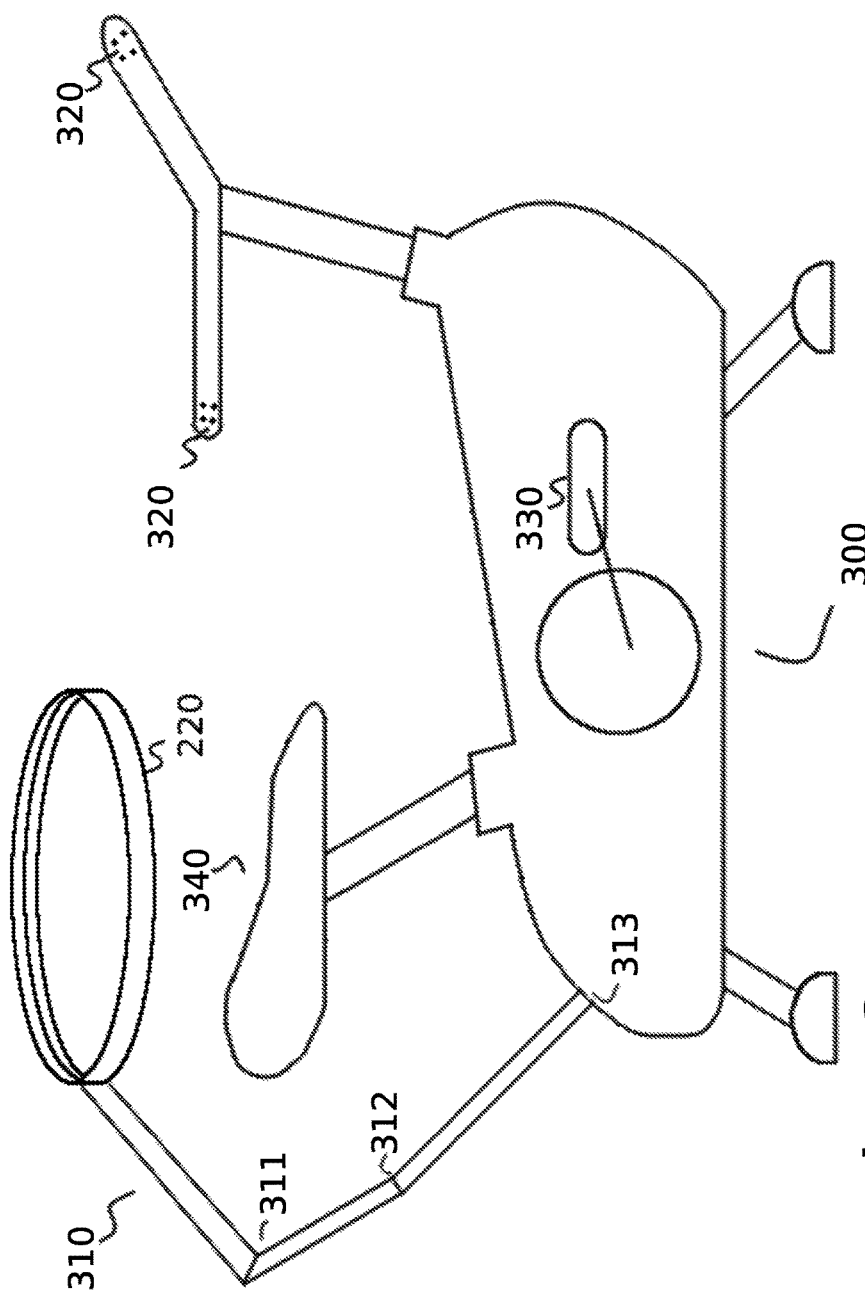
FIG. 3 is a diagram of an exemplary hardware arrangement of a bike apparatus for use in a virtual or mixed reality system with a belt and arm attachment for user interaction and movement tracking, according to a preferred aspect of the invention.

FIG. 3 is a block diagram of an exemplary system architecture of a generic stationary bicycle 300 system with hand controls on the handles 320, and a belt-like harness attachment 220, according to a preferred aspect of the invention. A stationary exercise bicycle device 300, which may be of any particular design including a reclining, sitting, or even unicycle-like design, possesses two pedals 330 as is common for stationary exercise bicycles of all designs. On handlebars of a stationary exercise bicycle may exist buttons and controls 320 for interacting with a virtual or mixed reality augmented piece of software, allowing a user to press buttons in addition to or instead of pedaling, to interact with the software. A belt-like harness attachment 220 is attached via a mechanical arm 310 to a stationary exercise bicycle 300, which may monitor motion and movements from a user during the execution of virtual reality software. A mechanical arm 310 may have an outer shell composed of any material, the composition of which is not claimed, but must have hinges 311, 312, 313 which allow for dynamic movement in any position a user may find themselves in, and angular sensors inside of the arm at the hinge-points 311, 312, 313 for measuring the movement in the joints and therefore movement of the user. A stationary bicycle device 300 may also have a pressure sensor in a seat 340, the sensor itself being of no particularly novel design necessarily, to measure pressure from a user and placement of said pressure, to detect movements such as leaning or sitting lop-sided rather than sitting evenly on the seat.

Figure 4:
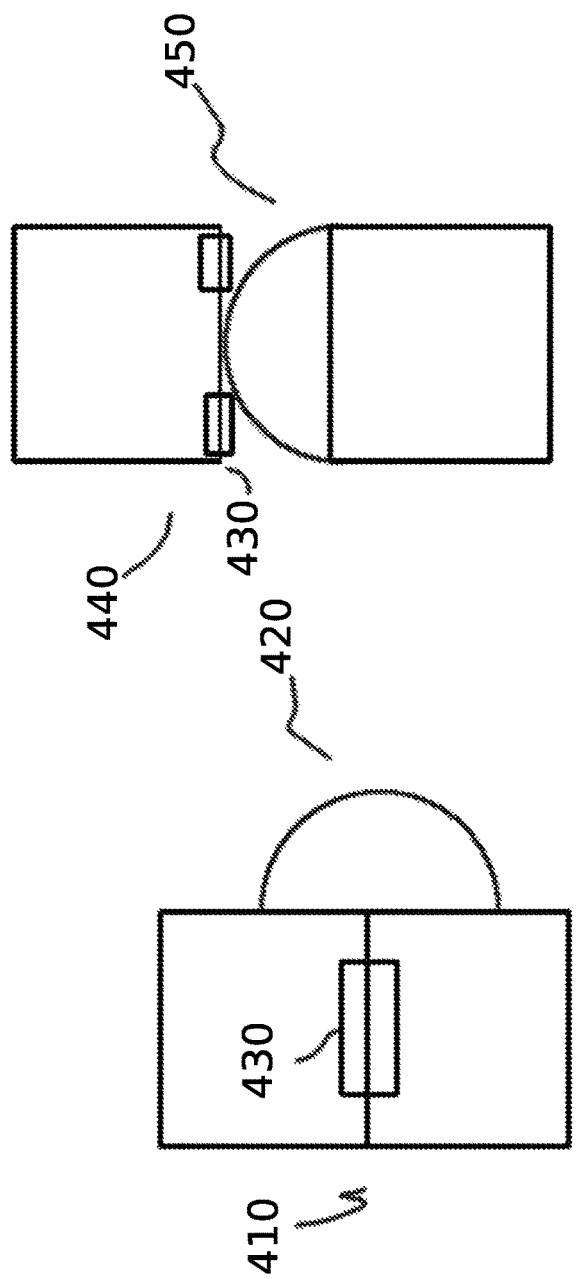
FIG. 4 is a diagram of an additional exemplary hardware arrangement of an apparatus for natural body tracking and feedback for electronic interaction according to a preferred embodiment of the invention, illustrating the use of angle sensors to detect angled movement of a mechanical multi-jointed arm.

FIG. 4 is a diagram of an additional exemplary hardware arrangement of an apparatus for natural body tracking and feedback for electronic interaction according to a preferred embodiment of the invention, illustrating the use of angle sensors to detect angled movement of a mechanical multi-jointed arm 310. A multi-jointed arm 310 may have several joints 410 which possess a hinge of some manner 420, and importantly, an angle sensor 430, which may be used to measure the openness of a hinged joint. In one use case, a joint may be used for a mechanical arm 310 which allows flexing up to 180 degrees of movement in one direction, allowing for a flexible but easily detectable arm movement which may be utilized in virtual or mixed reality software. In an alternate hardware arrangement, a ball type joint is used 440 using a ball-bearing type device 450 and angle sensors 430 to determine the three-dimensional rotation around a ball 450, allowing virtual or mixed reality software to determine the movement of a user. Using one or both of these hardware arrangements a mechanical arm 310 is capable of measuring user movement while wearing a belt 220 on a stationary bicycle device 300.

Figure 5:
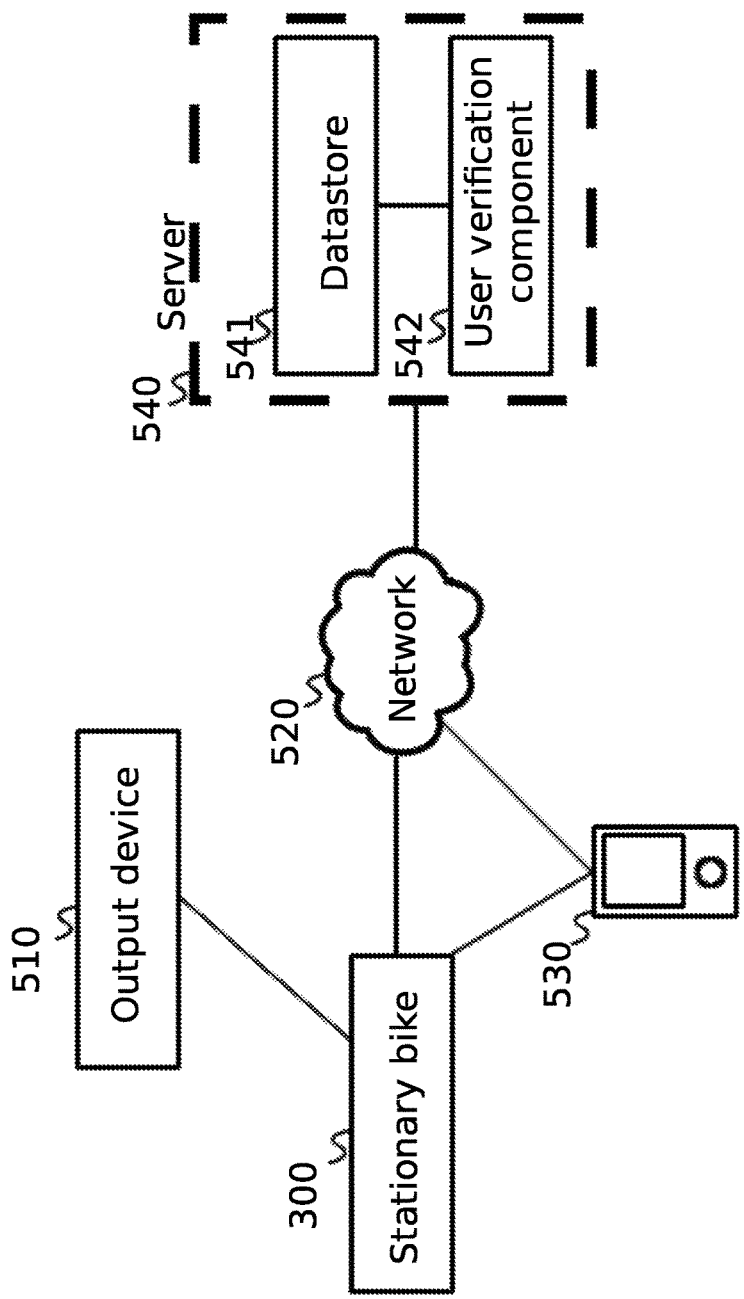
FIG. 5 is a block diagram of an exemplary system architecture of a stationary exercise bicycle being connected over local connections to a smartphone, an output device other than a phone, and a server over a network, according to a preferred aspect.

FIG. 5 is a block diagram of an exemplary system architecture of a stationary exercise bicycle 300 being connected over local connections to a smartphone or computing device 530, an output device other than a phone 510, and a server over a network 540, according to a preferred aspect. A stationary exercise bicycle 300 may connect over a network 520, which may be the Internet, a local area connection, or some other network used for digital communication between devices, to a server 540. Such connection may allow for two-way communication between a server 540 and a stationary exercise bicycle 300. A stationary exercise bicycle 300 may also be connected over a network 520 to a smartphone or computing device 530, or may be connected directly to a smartphone or computing device 530 either physically or wirelessly such as with Bluetooth connections. A stationary exercise bicycle 300 also may be connected to an output device 510 which may display graphical output from software executed on a stationary exercise bicycle 300, including Mixed or virtual reality software, and this device may be different from a smartphone or computing device 530 or in some implementations may in fact be a smartphone or computing device 530. A remote server 540 may contain a data store 541, and a user verification component 542, which may contain typical components in the art used for verifying a user's identity from a phone connection or device connection, such as device ID from a smartphone or computing device or logging in with a user's social media account.

Figure 6:
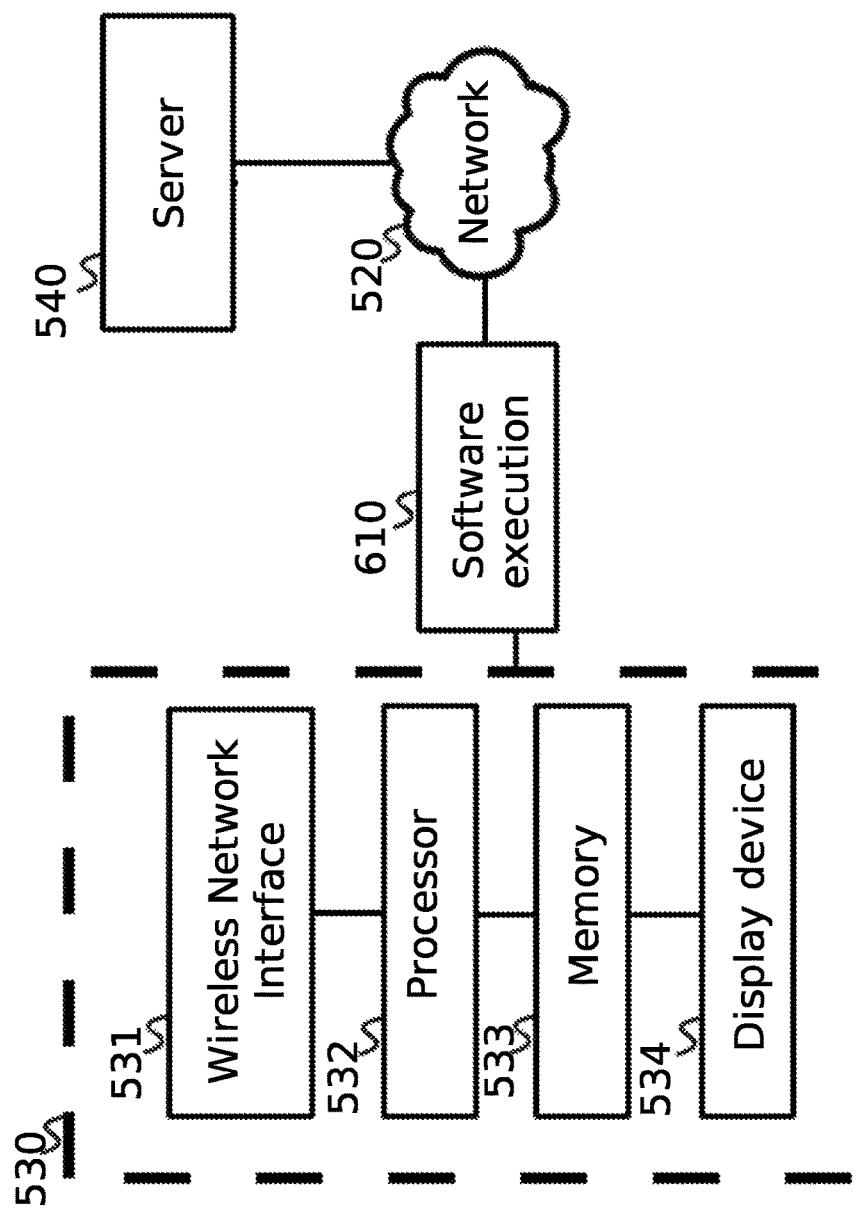
FIG. 6 is a diagram of an exemplary hardware arrangement of a smart phone or computing device running a user identification component and communicating over a network, according to a preferred aspect.

FIG. 6 is a diagram of an exemplary hardware arrangement of a smart phone or computing device 530 executing software 610 and communicating over a network 520, according to a preferred aspect. In an exemplary smart phone or computing device 530, key components include a wireless network interface 531, which may allow connection to one or a variety of wireless networks including Wi-Fi and Bluetooth; a processor 532, which is capable of communicating with other physical hardware components in the cellular device 530 and running instructions and software as needed; system memory 533, which stores temporary instructions or data in volatile physical memory for recall by the system processor 532 during software execution; and a display device 534, such as a Liquid Crystal Display (LCD) screen or similar, with which a user may visually comprehend what the cellular device 530 is doing and how to interact with it. It may or may not be a touch enabled display, and there may be more components in a cellular device 530, beyond what are crucially necessary to operate such a device at all. Software 610 operating on a processor 533 may include a mixed or virtual reality application, a user verification system, or other software which may communicate with a network-enabled server 540 and stationary exercise bicycle 300 software for the purposes of enhanced mixed or virtual reality.

Figure 7:
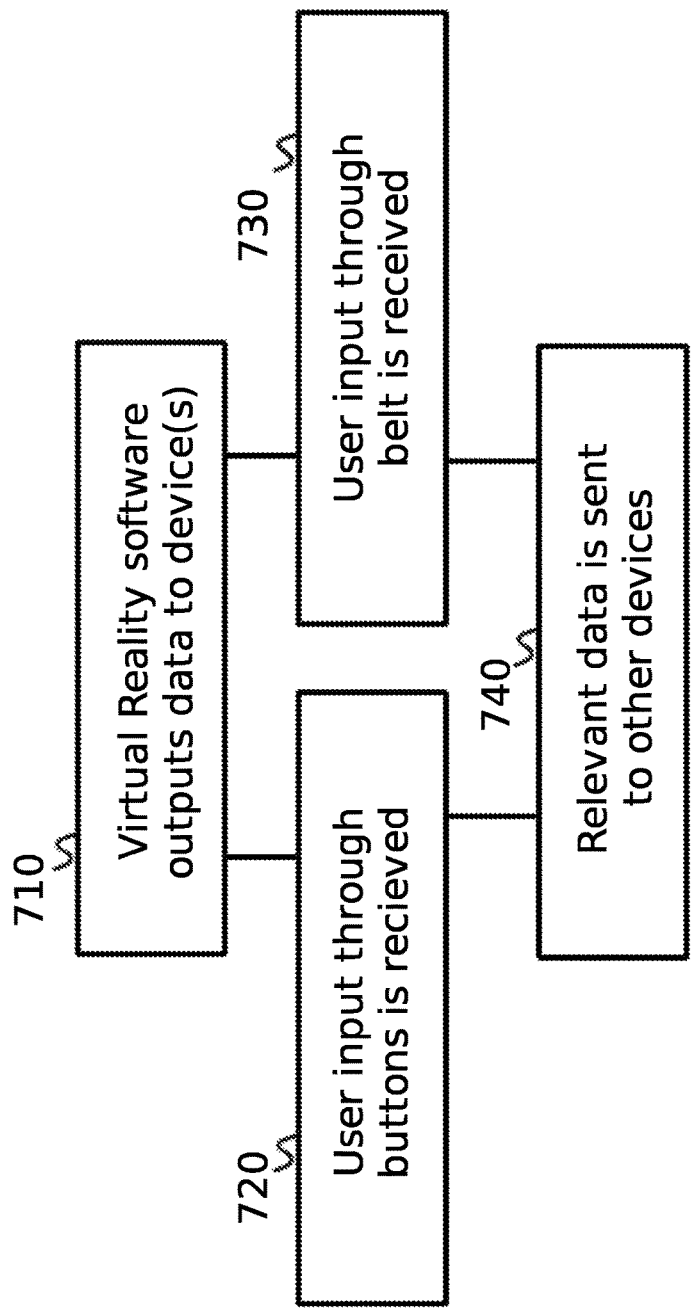
FIG. 7 is a block diagram of a method of mixed or virtual reality software operating to receive input through different sources, and send output to devices, according to a preferred aspect.

FIG. 7 is a block diagram of a method of mixed or virtual reality software operating to receive input through different sources, and send output to devices, according to a preferred aspect. Mixed or virtual reality software which may be run on a phone or computing device 530, 610 or another device, outputs data to a visual device for the purpose of graphically showing a user what they are doing in the software 710. Such display may be a phone display 534, or a separate display device 510, such as a screen built into a stationary exercise bicycle 300 or connected some other way to the system, or both display devices. During software execution, user input may be received either through buttons 730 on the stationary exercise bicycle 320, 720, or through input from a belt-like harness 220, such as user orientation or movements. Such received data may be sent 740 to either a mobile smart phone or computing device 530, or to a server 540 over a network 520, or both, for processing, storage, or both. Data may be stored on a server with a data store device 541 and may be processed for numerous uses including user verification with a user verification component 542. Data may be processed either by software running on a stationary exercise bicycle 300, a smart phone or computing device 530, or some other connected device which may be running mixed or virtual reality software, when input is received from a user using either buttons on a stationary exercise bicycle 320, a belt-like harness 220, or both, and optionally using bike pedals 330 in mixed or virtual reality software for tasks such as representing movement in a simulation.

Figure 12:
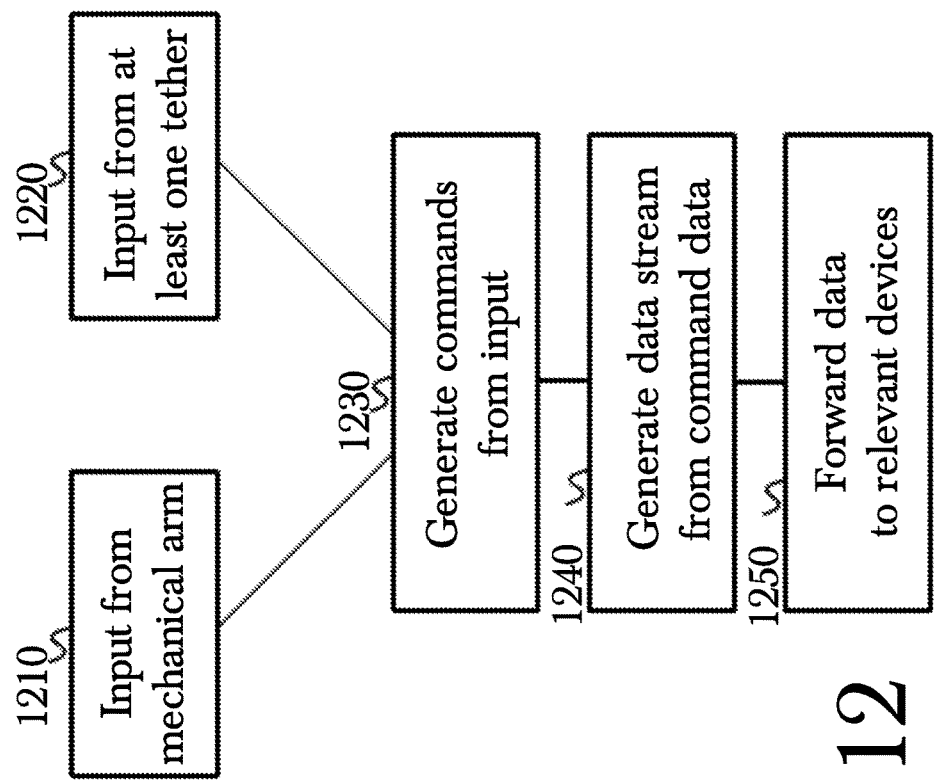
FIG. 12 is a block diagram illustrating an exemplary method for natural body interaction for mixed or virtual reality applications, according to a preferred aspect of the invention.

FIG. 12 is another block diagram illustrating an exemplary method for natural body interaction for mixed or virtual reality applications, according to a preferred aspect of the invention. First, input may be gathered from either a mechanical arm attached to a harness 1210, 220, 310, or a plurality of tethers 1220 attached to a harness 1220, 210*a-n*. Input may be gathered 1210 using hinges with angular sensors 311, 312 attached to a mechanical arm 310, or from tethers 210*a-n* which may be attached to a stationary exercise bike and either a user, or a harness attached to a user 220. Input commands may be generated from received raw input 1230, such commands being relatable command actions for a virtual or augmented reality system. A compound data stream may be formed 1240 which may include command data, before all relevant data is forwarded to related devices 1250 such as an attached screen, or a remote server, or a mobile device.

Figure 13:
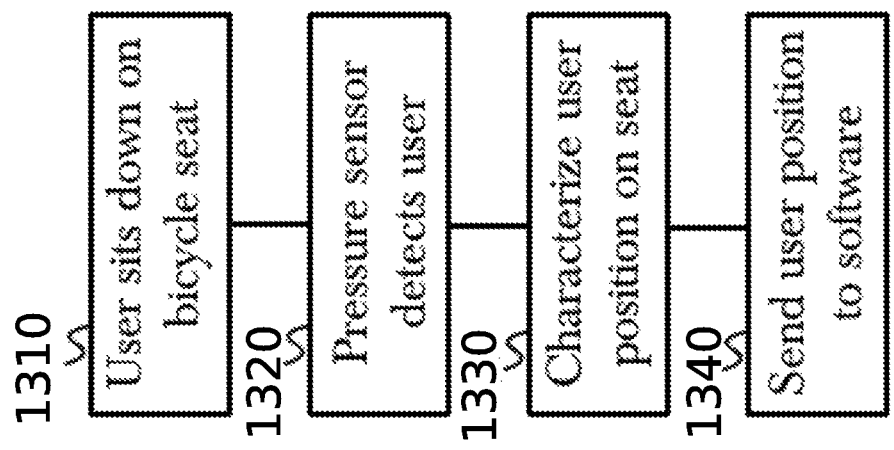
FIG. 13 is a block diagram illustrating an exemplary method for implementing an aspect of an embodiment, the pressure sensor.

FIG. 13 is a method diagram illustrating an exemplary method for implementing an aspect of an embodiment, the pressure sensor 340. First, in order for user position to be detected in this manner, a user must sit on a bicycle seat equipped with a pressure sensor 340, 1310. Upon a user sitting 1310 on such an equipped seat 340, a pressure sensor contained within a seat 340 may detect a user's presence 1320 when sitting. Characterization of the pressure present when a user sits on a pressure sensor 1310 may be used to characterize a user's position on a seat 1330, using techniques such as comparing relative pressure on different parts of a seat, or combining pressure data with data gathered from a harness 220 to form a comprehensive analysis of user positioning. Pressure data and any derived or calculated user position data may be sent to any relevant software 1340 including software operating on a connected mobile device 530, 610, or which may be running elsewhere such as a different connected device, or software which may be running on a stationary exercise bicycle itself.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
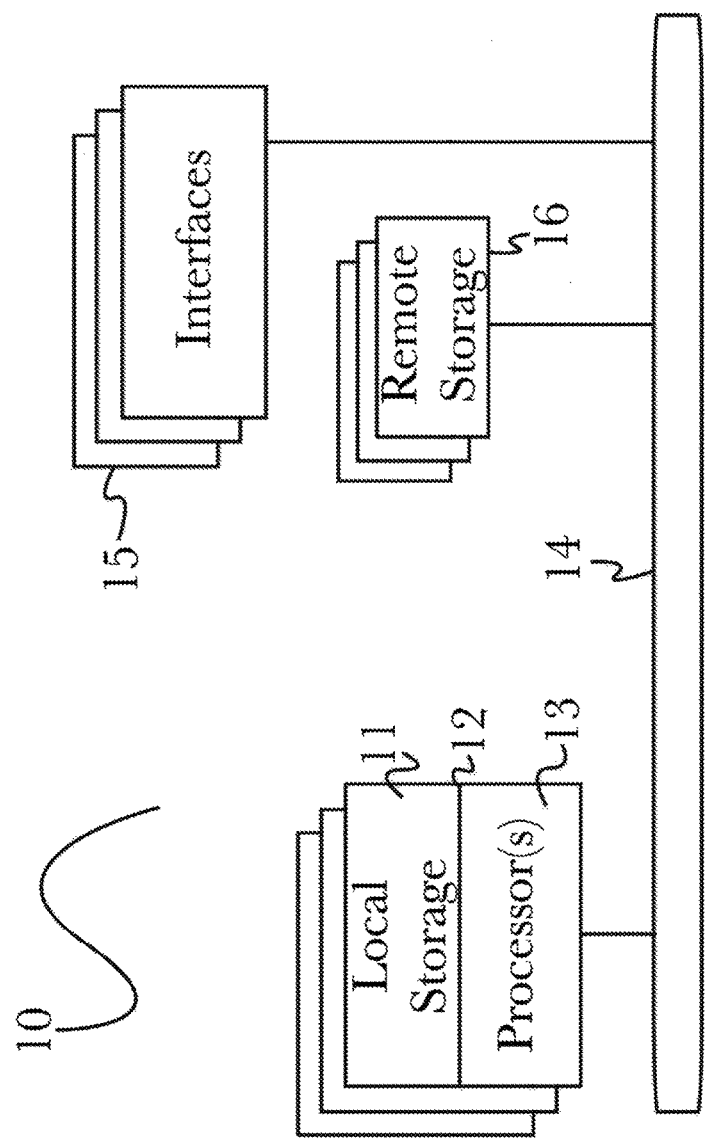
FIG. 8 is a block diagram illustrating an exemplary hardware architecture of a computing device.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 702.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
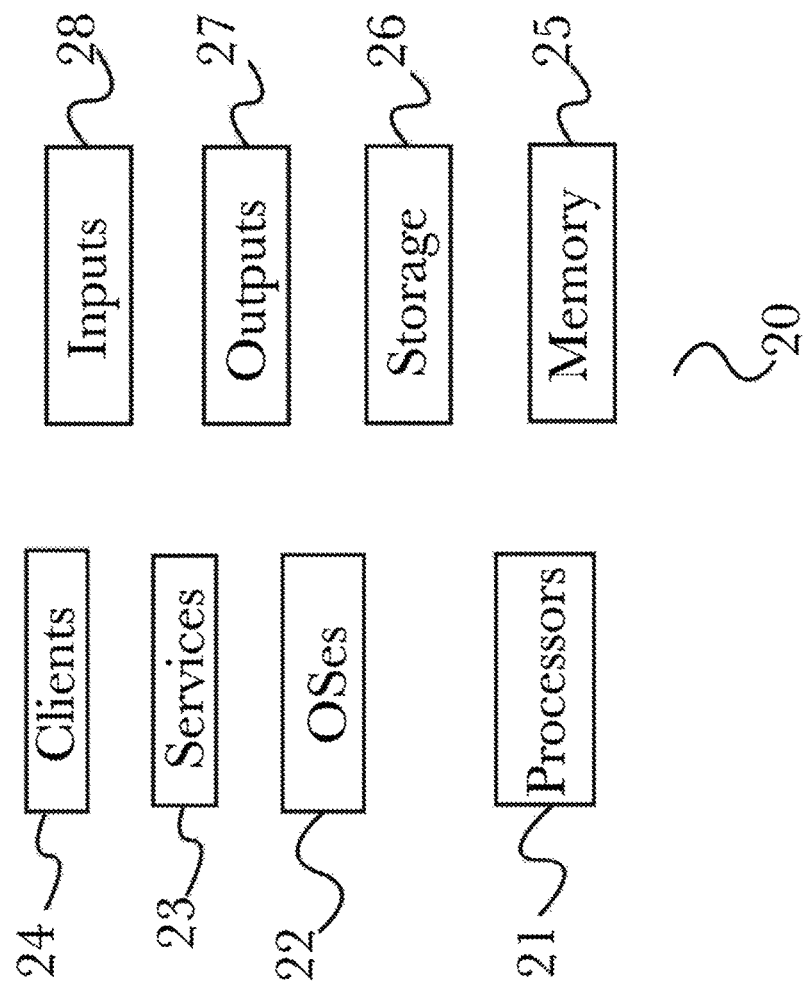
FIG. 9 is a block diagram illustrating an exemplary logical architecture for a client device.

In some embodiments, systems according to the present invention may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
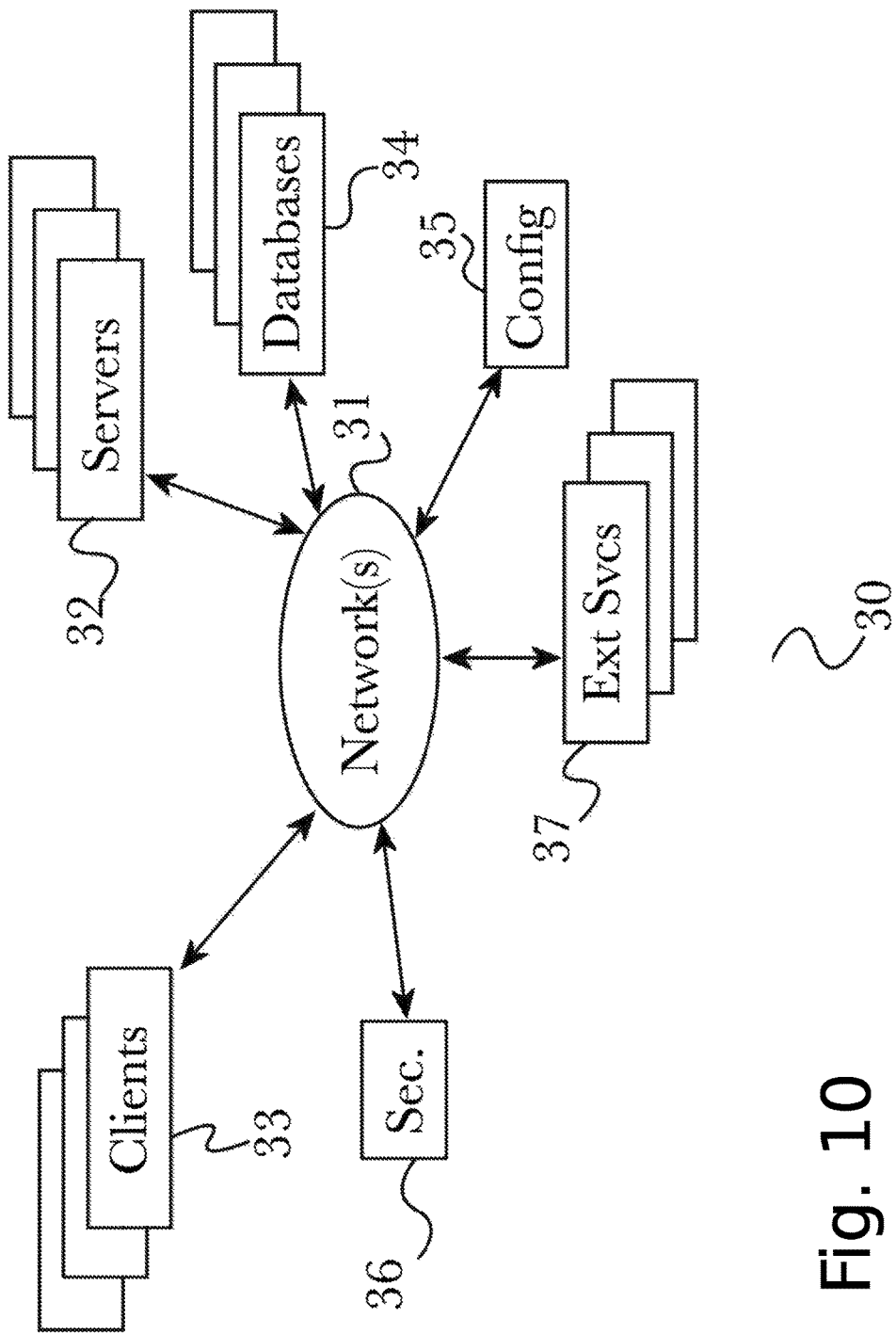
FIG. 10 is a block diagram showing an exemplary architectural arrangement of clients, servers, and external services.

In some embodiments, systems of the present invention may be implemented on a distributed computing network, such as one having any number of clients and/or servers. Referring now to FIG. 10, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 11:
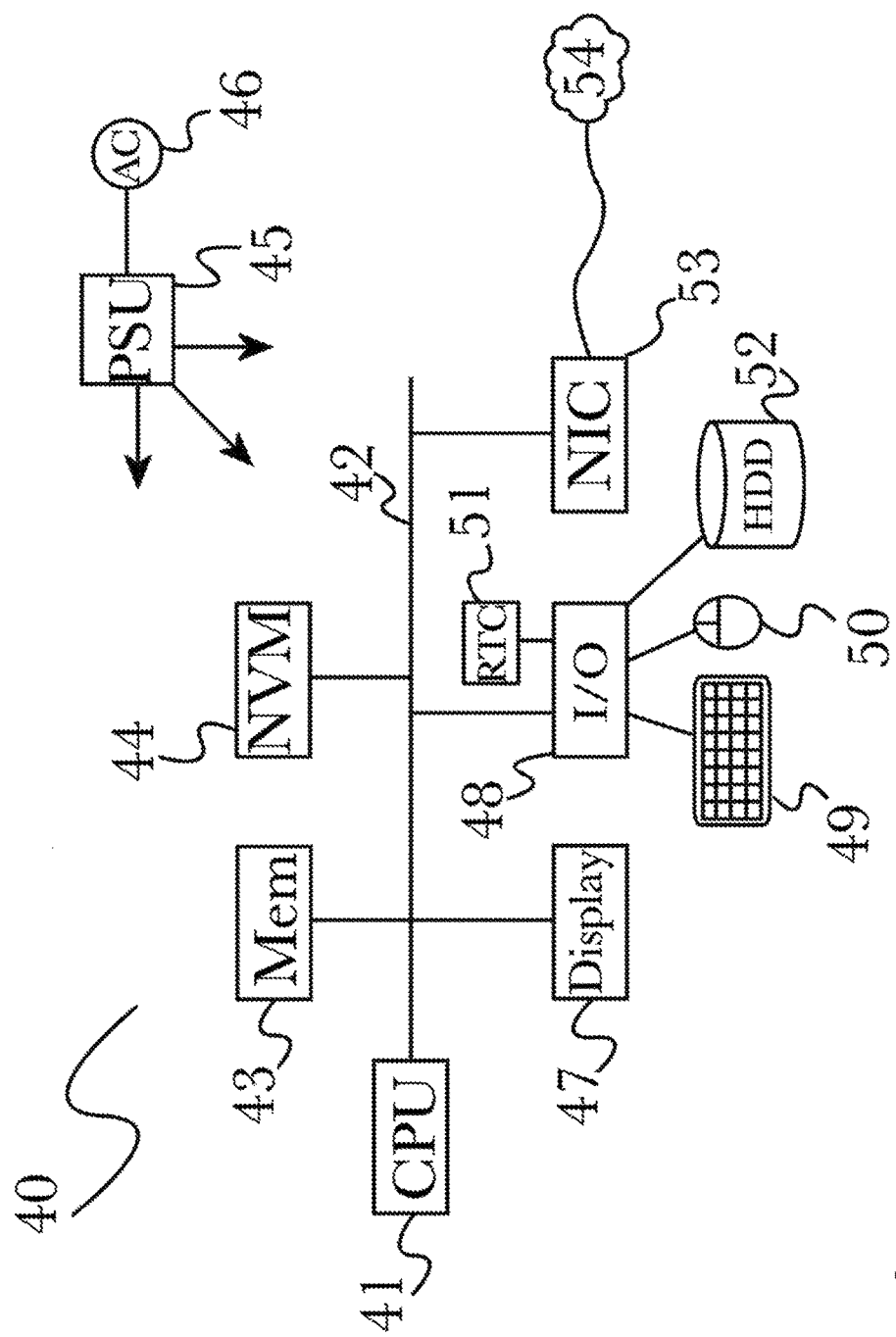
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for a mixed or virtual reality-enhanced stationary exercise bicycle, comprising:
   a stationary exercise bicycle;
   a mechanical arm comprising a plurality of hinges and a plurality of tethers affixed to the body of a user while seated at the stationary exercise bicycle, at least one of the plurality of hinges comprising an angular sensor that measures the openness of the hinge;
   a composition server comprising at least a plurality of programming instructions stored in a memory and operating on a processor of a network-connected computing device and configured to:
      receive input data based on motion of a user's body from a plurality of hardware devices via a network, the plurality of hardware devices comprising at least the angular sensor and the plurality of tethers;
      produce a plurality of control commands based on the received input data;
      produce a composite data stream based at least in part on at least a portion of the received input data and the control commands, wherein the composite data stream further comprises derived data produced from analysis of at least a portion of the received input data, wherein the derived data comprises data pertaining to the position of a plurality of body parts relative to one another;
   wherein the plurality of tethers provides a haptic feedback signal to a mixed or virtual reality application; and
   wherein one or more of the plurality of tethers physically limits a user's motion based at least in part on the haptic feedback signal.

2. The system of claim 1, wherein the plurality of hardware devices further comprise a pressure sensor.

3. The system of claim 2, wherein the pressure sensor is a component of a seat of the stationary exercise bicycle.

4. The system of claim 1, wherein the stationary exercise bicycle further comprises a plurality of hardware controls, the hardware controls comprising at least a button, and wherein the plurality of hardware devices comprises at least a portion of the hardware controls.

5. The system of claim 4, wherein the hardware controls comprise at least one pedal of the stationary exercise bicycle.

6. The system of claim 1, further comprising a screen or virtual reality headset, wherein output from mixed or virtual reality software is output to a screen attached to or located near a stationary exercise bicycle, or to a virtual reality headset worn by the user.

7. A method for a mixed or virtual reality-enhanced stationary exercise bicycle, comprising the steps of:
   (a) receiving, at a composition server comprising at least a plurality of programming instructions stored in a memory and operating on a processor of a network-connected computing device and configured to receive input data based on motion of a user's body from a plurality of hardware devices via a network, and configured to produce a plurality of operations of the virtual body joystick based at least in part on at least a portion of the received input data, and configured to produce a composite data stream based at least in part on at least a portion of the received input data and the virtual body joystick operations, a plurality of device inputs received from a plurality of hardware devices;
   (b) producing a plurality of control commands based at least in part on the plurality of device inputs;
   (c) producing a composite data stream based at least in part on at least a portion of the received input data and the control commands, wherein the composite data stream further comprises derived data produced from analysis of at least a portion of the received input data, wherein the derived data comprises data pertaining to the position of a plurality of body parts relative to one another;
   wherein at least a portion of the plurality of hardware devices comprise a mechanical arm comprising a plurality of hinges and a plurality of tethers affixed to the body of a user while seated at the stationary exercise bicycle, at least one of the plurality of hinges comprising an angular sensor that measures the openness of the hinge;
   wherein the plurality of tethers provides a haptic feedback signal to a mixed or virtual reality application; and
   wherein one or more of the plurality of tethers physically limits a user's motion based at least in part on the haptic feedback signal.

8. The method of claim 7, wherein the plurality of hardware devices further comprise a pressure sensor.

9. The method of claim 8, wherein the pressure sensor is a component of a seat of the stationary exercise bicycle.

10. The system of claim 7, wherein the stationary exercise bicycle further comprises a plurality of hardware controls, the hardware controls comprising at least a button, and wherein the plurality of hardware devices comprises at least a portion of the hardware controls.

11. The method of claim 7, wherein the hardware controls comprise at least one pedal of the stationary exercise bicycle.

12. The method of claim 7, wherein output from mixed or virtual reality software is output to a screen attached to or located near a stationary exercise bicycle, or to a virtual reality headset worn by the user.

* * * * *